United States Patent (10) Patent No.: US 12,546,761 B2
Schmidt (45) Date of Patent: Feb. 10, 2026

(54) BUILDING MATERIAL APPARATUS AND USE OF AT LEAST ONE PART SENSOR

(71) Applicant: Putzmeister Engineering GmbH, Aichtal (DE)

(72) Inventor: Harald Schmidt, Memmingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 210 days.

(21) Appl. No.: 18/277,124

(22) PCT Filed: Feb. 15, 2022

(86) PCT No.: PCT/EP2022/053597
§ 371 (c)(1),
(2) Date: Aug. 14, 2023

(87) PCT Pub. No.: WO2022/175232
PCT Pub. Date: Aug. 25, 2022

(65) Prior Publication Data
US 2024/0125762 A1 Apr. 18, 2024

(30) Foreign Application Priority Data
Feb. 16, 2021 (DE) ...................... 10 2021 201 456.9

(51) Int. Cl.
*G01N 33/38* (2006.01)
*B60P 3/16* (2006.01)
(Continued)

(52) U.S. Cl.
CPC ............. *G01N 33/383* (2013.01); *B60P 3/16* (2013.01); *E04G 21/025* (2013.01); *E04G 21/0445* (2013.01); *G01N 22/04* (2013.01)

(58) Field of Classification Search
CPC ......... G01N 33/383; G01N 22/04; B60P 3/16; E04G 21/025; E04G 21/0445;
(Continued)

(56) References Cited

U.S. PATENT DOCUMENTS 4,900,154 A * 2/1990 Waitzinger ............ B28C 5/4231
366/40
2003/0015024 A1* 1/2003 Campbell ............ G01N 27/223
73/73

FOREIGN PATENT DOCUMENTS

CN 204645658 U 9/2015
CN 209670357 U 11/2019
(Continued)

OTHER PUBLICATIONS

International Search Report (PCT/ISA/210) issued in PCT Application No. PCT/EP2022/053597 dated Apr. 14, 2022 with English translation (5 pages).
(Continued)

*Primary Examiner* — Donnell A Long
(74) *Attorney, Agent, or Firm* — Crowell & Moring LLP

(57) ABSTRACT

A building material apparatus includes at least one building material transport part which follows a building material drum, wherein the building material transport part is designed to transport building material which is to be at least partially cured, and at least one part sensor. The part sensor is arranged on and/or in the building material transport part and is designed to detect at least one intensive variable, or at least one variable which corresponds at least to the intensive variable, of the building material in the building material transport part.

14 Claims, 2 Drawing Sheets

(51) Int. Cl.
*E04G 21/02* (2006.01)
*E04G 21/04* (2006.01)
*G01N 22/04* (2006.01)

(58) Field of Classification Search
CPC . E04G 21/04; E04G 21/0481; E04G 21/0436; B28C 5/4258; B28C 7/024; B28C 7/161; B28C 7/163; G01K 11/006
See application file for complete search history.

(56) References Cited

FOREIGN PATENT DOCUMENTS

| | | | | |
|---|---|---|---|---|
| DE | 19512924 A1 | * | 10/1996 | ............... G01N 1/20 |
| DE | 197 19 696 A1 | | 11/1998 | |
| DE | 199 08 151 A1 | | 11/2000 | |
| DE | 199 52 978 A1 | | 5/2001 | |
| DE | 20 2010 012 841 U1 | | 1/2011 | |
| DE | 10 2012 017 445 A1 | | 3/2014 | |
| DE | 10 2017 104 459 A1 | | 9/2018 | |
| DE | 10 2018 204 819 A1 | | 10/2019 | |
| EP | 1 447 192 A1 | | 8/2004 | |
| GB | 2329027 A | * | 3/1999 | ............. G01N 11/00 |
| JP | 6725284 B2 | | 7/2020 | |
| NL | 1022669 C1 | | 8/2004 | |
| WO | WO 2011/004982 A2 | | 1/2011 | |

OTHER PUBLICATIONS

German-language Written Opinion (PCT/ISA/237) issued in PCT Application No. PCT/EP2022/053597 dated Apr. 14, 2022 with English translation (11 pages).
Ludwig M., "Monitoring all process-relevant measurement data of truck mixer drums", Ludwig Moisture Control, FL-MOBIMIC-Inspector, CIP—Concrete Plant International, 2019 (5 pages).
Ludwig, F., "Moisture measurement with FL-WAPP for Industry 4.0", Ludwig Feuchtemessung, FL-WAPP Sensor, BFT International, 2017 (4 pages).
Chinese-language Office Action issued in Chinese Application No. 202280015406.X dated Jun. 20, 2025 with English translation (18 pages).
Japanese-language Office Action issued in Japanese Application No. 2023-549022 dated Nov. 11, 2025, with English translation (11 pages).

* cited by examiner

BUILDING MATERIAL APPARATUS AND USE OF AT LEAST ONE PART SENSOR

APPLICATION AREA AND PRIOR ART

The invention relates to a building material apparatus having at least one part sensor and to the use of at least one such part sensor, in particular of such a building material apparatus.

OBJECT AND SOLUTION

The object on which the invention is based is that of providing a building material apparatus having at least one part sensor and the use of at least one such part sensor, in particular of such a building material apparatus, which each have improved properties.

The building material apparatus according to the invention comprises or has at least, in particular only, one, in particular single, building material transport part, in particular intended to follow or following or downstream and/or different from a building material drum, and at least, in particular only, one, in particular single and/or electrical, part sensor. The building material transport part is designed or configured for transporting building material which is in particular still to be cured or is to be cured at least, in particular only, partially, in particular completely, or which is not cured or not hardened, in particular in the building material transport part and/or following or downstream of the building material drum. At least the part sensor is arranged or mounted, in particular fastened, in particular completely and/or directly, on and/or in the building material transport part and designed or configured to, in particular automatically, detect in particular only or at least one intensive variable, in particular a value of the intensive variable, or at least one variable, which corresponds at least to the intensive variable, in particular a value of the corresponding variable, of the building material, in particular transported, in the building material transport part.

This, in particular the arrangement of the part sensor on and/or in the building material transport part following the building material drum, allows good accessibility to the part sensor and/or low wear of the part sensor and/or a small consumption of installation space by the part sensor, in particular by contrast with an arrangement not according to the invention of a part sensor on and/or in a building material drum. This thus allows simple cleaning, simple maintenance, simple repair and/or simple exchange of the part sensor. Additionally or alternatively, this, in particular thus, allows reliable detection of the intensive variable or the corresponding variable, in particular by means of the part sensor. Additionally or alternatively, the intensive variable or the corresponding variable can be interesting and/or helpful, in particular for feedback, for a subsequent metering or mixing or batch of building material.

In particular, the intensive variable or the corresponding variable can vary in the building material drum, for example on account of a cold outside temperature in winter or a warm outside temperature in summer, in particular from a building material mixing plant to a building site, in particular during transport.

The building material drum can be for a building material transport vehicle or be a part thereof.

The building material transport part can precede a formwork.

For transport of the building material, the building material transport part can be in, in particular direct, contact with the building material.

The building material which is to be cured at least partially can be thick matter and/or a mixture of liquid and solid components.

The part sensor can be arranged outside the building material drum or need not or cannot be arranged on and/or in the building material drum.

The part sensor need not or cannot be designed to detect an extensive variable or a variable, which corresponds to the extensive variable, of the building material.

The term "material property" can be used synonymously for the term "intensive variable".

In one development of the invention, the building material apparatus is a concrete apparatus. Additionally or alternatively, the building material transport part is a concrete transport part, in particular intended to follow or following or downstream and/or different from a concrete drum, in particular for a or of a concrete transport vehicle. Further additionally or alternatively, the building material transport part is designed or configured for transporting concrete or fresh concrete or transport concrete which is in particular still to be cured and/or to be completely cured, in particular in the concrete transport part and/or following or downstream of the concrete drum. Further additionally or alternatively, at least the part sensor is designed for detecting the intensive variable or the corresponding variable of the concrete. In other words: the building material can be concrete. For such a building material, the reliable detection of the intensive variable or the corresponding variable can be particularly advantageous and/or feedback, in particular for a subsequent metering or mixing or batch, can be particularly interesting and/or helpful.

In one development of the invention, at least the part sensor is designed or configured for detecting, in particular only, a moisture, in particular a value of the moisture, or a water content and/or a temperature, in particular a value of the temperature, of the building material. In other words: the intensive variable can be the moisture and/or the temperature. Reliable detection of such an intensive variable can be particularly advantageous, in particular for good curing or binding of the building material. Additionally or alternatively, such an intensive variable can be particularly interesting and/or helpful, in particular for a feedback, for a subsequent metering or mixing or batch of building material, in particular for good curing or binding of the building material.

In one development of the invention, at least the part sensor is designed or configured for detecting the intensive variable or the corresponding variable by means of microwaves, in particular microwave radiation, or on the basis of a microwave detection or measuring principle. This allows the detection of the moisture and/or the temperature. Otherwise, reference is made to the specialist literature.

In one development of the invention, the building material apparatus comprises or has a flat probe, in particular a disk probe or a rectangular probe. The flat probe comprises or has the part sensor. This makes it possible for the building material apparatus to be cost-effective, in particular by contrast with a rod probe, which is in particular not according to the invention. Additionally or alternatively, this allows the arrangement of the part sensor on and/or in the building material transport part. In particular, the flat probe can be arranged or mounted, in particular fastened, in particular completely and/or directly, on and/or in the building material transport part.

In one development of the invention, the building material transport part comprises or has a baffle plate. The part sensor is arranged or mounted, in particular fastened, in particular completely and/or directly, on and/or in the baffle plate. This allows particularly good detection of the intensive variable or the corresponding variable, in particular by means of the part sensor.

In one development of the invention, the building material transport part is an outlet hopper, in particular for a or of a building material transport vehicle and/or intended to follow or following or downstream of the building material drum, a chute, in particular for a or of a building material transport vehicle and/or intended to follow or following or downstream of an outlet hopper, a building material bucket, in particular a crane bucket, in particular intended to follow or following or downstream of an outlet hopper and/or a chute, an inlet hopper for a or of a building material pump, in particular intended to follow or following or downstream of an outlet hopper and/or a chute, and/or an end hose for a or of a building material pump and/or a building material distribution apparatus, in particular a building material distribution boom, in particular intended to follow or following or downstream of a building material pump. This, in particular the arrangement of the part sensor on and/or in such a building material transport part, allows particularly good accessibility to the part sensor. In particular, the chute can be an outlet chute. Additionally or alternatively, the building material bucket can be a concrete bucket. Further additionally or alternatively, the building material pump can be a thick matter and/or concrete pump and/or a mobile building material pump, in particular an automobile building material pump, in particular an automobile concrete pump. Further additionally or alternatively, the building material distribution boom can be a folding boom.

In one development of the invention, the building material apparatus comprises or has a, in particular the, building material transport vehicle, in particular a truck mixer, a, in particular the, building material pump and/or a, in particular the, building material distribution apparatus, in particular a, in particular the, building material distribution boom. In particular, the building material apparatus is the building material transport vehicle, in particular the truck mixer, the building material pump and/or the building material distribution apparatus, in particular the building material distribution boom. Additionally or alternatively, the building material apparatus comprises or has the building material drum, in particular a mixing drum. This allows, in particular the building material transport vehicle and/or the building material drum allow/allows, transport of the building material to a building site, in particular from a concrete mixing plant.

Additionally or alternatively, this allows, in particular the building material pump and/or the building material distribution apparatus allow/allows, transport of the building material on the building site, in particular from the building material transport vehicle and/or to a formwork. In particular, the truck mixer can be a mobile concrete mixer or a concrete mixing vehicle and/or a drum mixer, in particular a reversing drum mixer. Additionally or alternatively, the building material pump can be a thick matter and/or concrete pump and/or a mobile building material pump, in particular an automobile building material pump, in particular an automobile concrete pump. Further additionally or alternatively, the building material distribution boom can be a folding boom. Further additionally or alternatively, the mixing drum can be a truck mixer drum.

In one development of the invention, the building material apparatus comprises or has a, in particular electrical, ascertaining device, in particular a detecting device. The ascertaining device is designed or configured for, in particular automatically, ascertaining, in particular the detecting device is designed or configured for detecting, in particular only, a consistency, in particular a value of the consistency, and/or a viscosity, in particular a value of the viscosity, or a variable corresponding to the consistency and/or the viscosity, in particular a value of the corresponding variable, of the building material, in particular in the building material drum, in particular a drive variable, in particular a value of the drive variable, of a drive device for rotationally driving or for driving the rotation of the building material drum. Such a variable can be complementary to the intensive variable or the corresponding variable, in particular the moisture and/or the temperature, and/or, in particular thus, be particularly interesting and/or helpful, in particular for a feedback, for a subsequent metering or mixing of building material. In particular, the consistency and/or the viscosity or the corresponding variable can be different from and/or complementary to the intensive variable or the corresponding variable, detected in particular by means of at least the part sensor. Additionally or alternatively, the ascertaining device can be different from at least the part sensor. Further additionally or alternatively, the ascertaining device can be designed or configured for, in particular automatically, ascertaining the consistency and/or the viscosity on the basis of the drive variable. Further additionally or alternatively, the ascertaining device can have, in particular be, a computer. Further additionally or alternatively, the drive variable can have, in particular be, a hydraulic drive pressure, in particular of the drive device in the form of a hydraulic drive device, a drive torque and/or a drive current, in particular of an electrical drive device. Further additionally or alternatively, the building material apparatus can have or comprise the drive device. Otherwise, reference is made to the specialist literature.

In one development, in particular one embodiment, of the invention, the building material apparatus comprises or has an, in particular electrical, determining device. The determining device is designed or configured for, in particular automatically, determining a metering or mixing or recipe variable, in particular a value of the metering variable, on the basis of at least the detected intensive variable of the detected corresponding variable, in particular and the ascertained consistency and/or the ascertained viscosity or the ascertained corresponding variable, and information on an arrangement location of the part sensor and/or on the building material transport part, in particular a type of the building material transport part. The information allows the determination of the metering variable, in particular by means of an arrangement location-specific and/or building material transport part-specific characteristic formula and/or an arrangement location-specific and/or building material transport part-specific characteristic map. Additionally or alternatively, the metering variable allows an, in particular meaningful, feedback for a subsequent metering or mixing or batch of building material. Further additionally or alternatively, the determining device can have, in particular be, a computer.

In one development, in particular one embodiment, of the invention, the building material apparatus comprises or has an, in particular electrical, data transmission device. The data transmission device is designed or configured for, in particular automatic and/or wireless, data transmission of at least the detected intensive variable or the detected corresponding variable, in particular and the ascertained consistency and/or the ascertained viscosity or the ascertained corresponding variable and/or a piece of information, in particular the information, on an, in particular the, arrangement location of the part sensor and/or on the building material transport part, in particular a type of the building material transport part, or an, in particular the, metering or mixing or recipe variable based on the intensive variable, in particular and the consistency and/or the viscosity, or the corresponding variable, in particular and the information on the arrangement location of the part sensor and/or on the building material transport part, in particular to a data management system, in particular for a building material mixing plant or a building material mixing works. The information allows the determination of a, in particular of the, metering variable, in particular by means of an arrangement location-specific and/or building material transport part-specific characteristic formula and/or an arrangement location-specific and/or building material transport part-specific characteristic map. Additionally or alternatively, the data transmission allows an, in particular meaningful, feedback for a subsequent metering or mixing of building material. In particular, the building material mixing plant can be stationary and/or can be a concrete mixing plant or a concrete mixing works.

In one development of the invention, the building material apparatus comprises or has at least one, in particular electrical, auxiliary consumer, in particular a control device, or open-loop or closed-loop control device, for, in particular automatically, controlling or regulating the building material drum. For, in particular automatic and/or electrical, energy and/or data transmission, the auxiliary consumer and the part sensor are in particular connected to one another, in particular by an, in particular the and/or electrical and/or common, energy supply and/or data transmission device, in particular being only contact-connected, in particular electrically connected, in particular cable-connected. This allows a simple connection, in particular by contrast with a contactless connection not according to the invention. Additionally or alternatively, the contact-connection is made possible by the arrangement of the part sensor on and/or in the building material transport part following the building material drum. In particular, the auxiliary consumer can have, in particular be, a light, in particular a work headlight. Additionally or alternatively, the control device can be designed or configured to control the drive device, where present. Further additionally or alternatively, the control device can have, in particular be, a computer. Further additionally or alternatively, the auxiliary consumer and the part sensor can be designed or configured to be supplied with energy by the energy supply device. Further additionally or alternatively, the energy supply device can have, in particular be, an electrical energy store, in particular a battery, in particular an accumulator, and/or a mains connection, in particular a mains plug, for connection to an external power grid. Further additionally or alternatively, the building material apparatus, in particular the building material transport vehicle, can have or comprise the energy supply and/or data transmission device. Otherwise, reference is made to the specialist literature.

The use according to the invention is the, in particular automatic, use of at least one, in particular the, part sensor, in particular of an, in particular the, building material apparatus as stated above, arranged on and/or in a, in particular the, building material transport part, in particular of an, in particular the, building material apparatus as stated above, for, in particular automatically, detecting at least one, in particular the, intensive variable or at least one, in particular the, variable, which corresponds at least to the intensive variable, of, in particular the, building material, which is to be cured at least partially, in the building material transport part, in particular following or downstream of a, in particular the, building material drum. The building material transport part is designed for transporting the building material, in particular in the building material transport part and/or following or downstream of the building material drum. The use can allow some or even all of the advantages as stated above for the building material apparatus.

Further advantages and aspects of the invention will emerge from the claims and from the description of exemplary embodiments of the invention which are explained below on the basis of the figures.

DETAILED DESCRIPTION OF THE DRAWINGS

Figure 1:
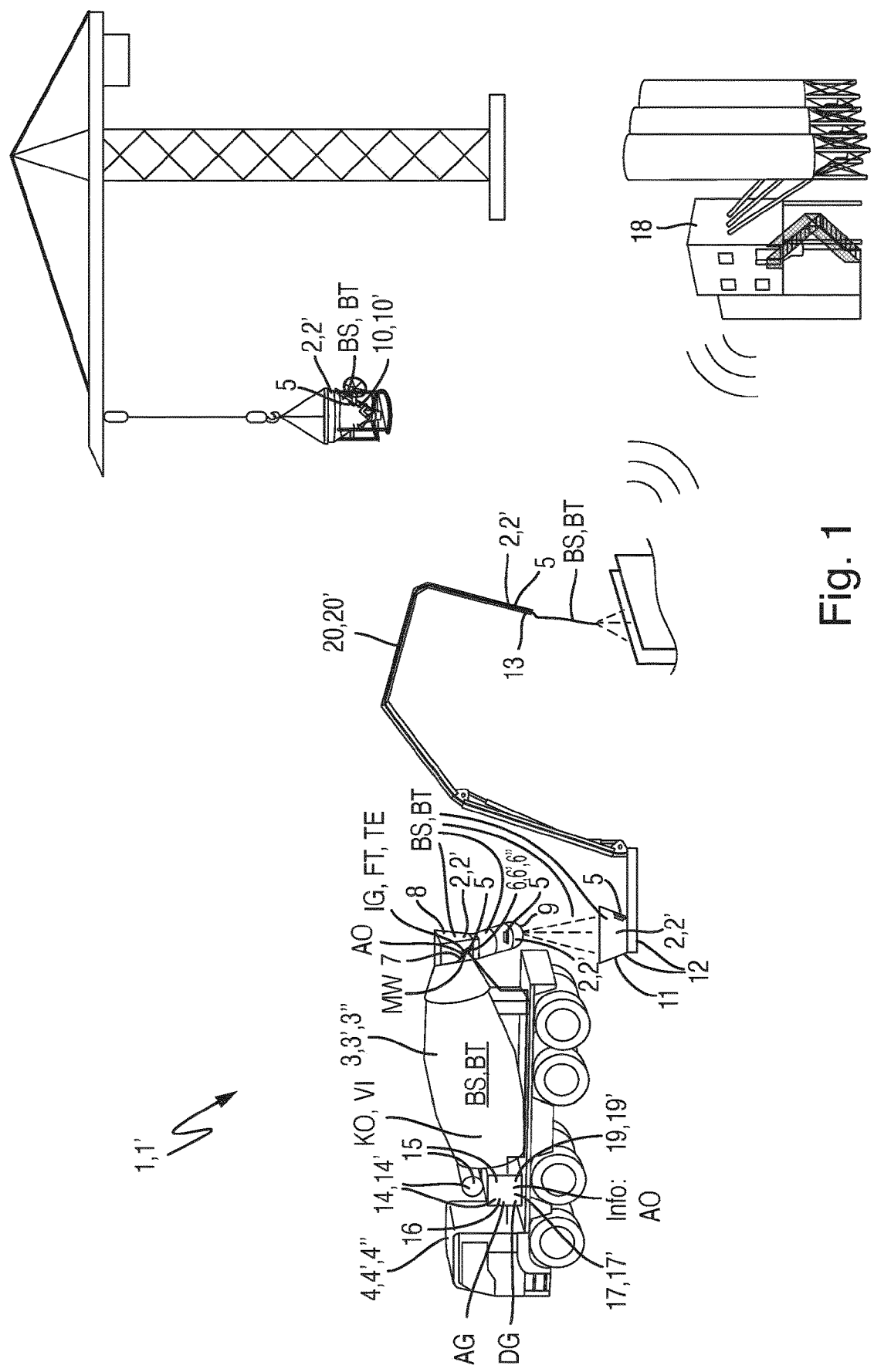
FIG. 1 shows a schematic view of a building material apparatus according to an embodiment of the invention having at least one part sensor and the use according to an embodiment of the invention of at least the part sensor, in particular of the building material apparatus.
Figure 2:
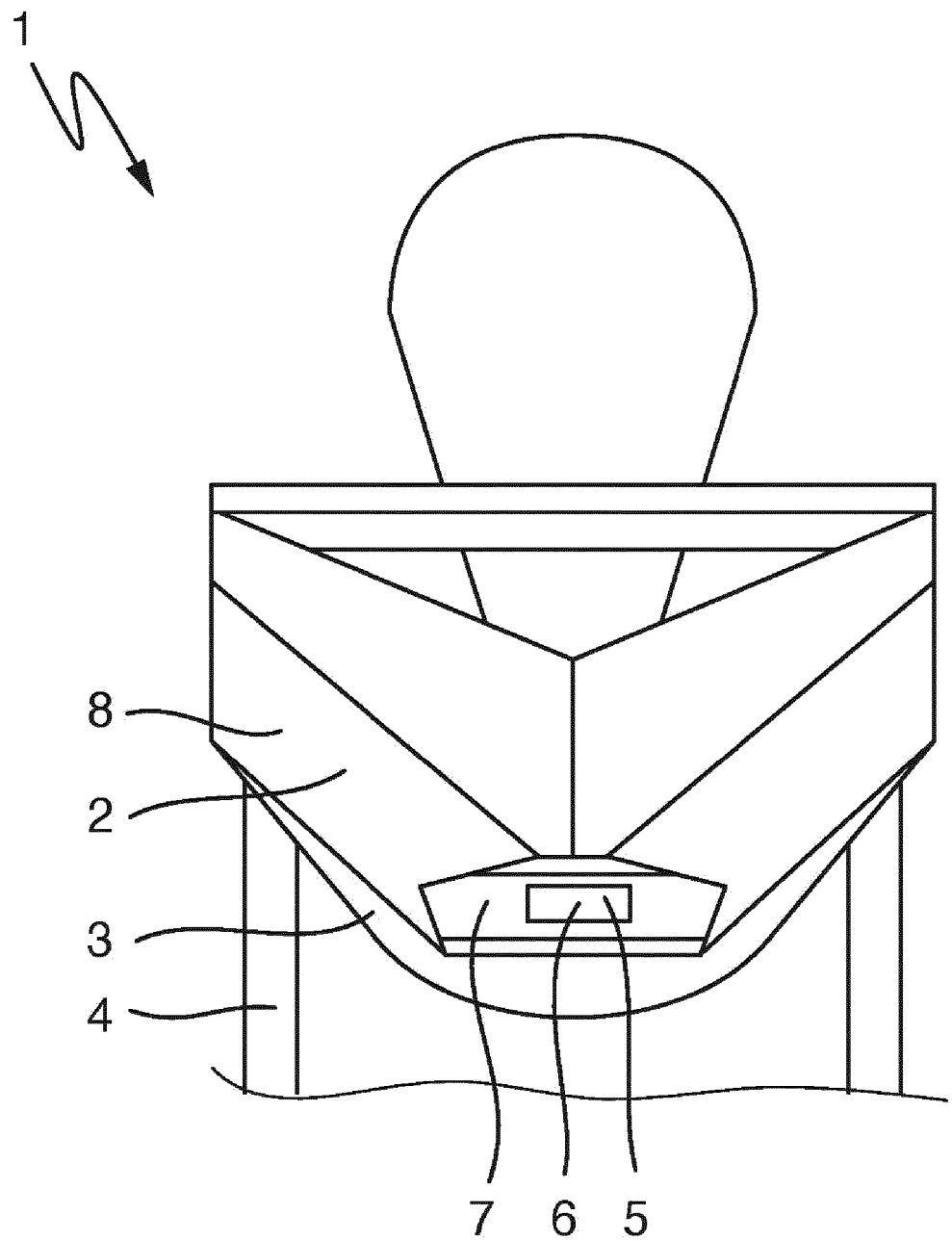
FIG. 2 shows a further schematic view of the building material transport part of FIG. 1 in the form of an outlet hopper.

FIGS. 1 and 2 show a building material apparatus 1. The building material apparatus 1 has at least one building material transport part 2 intended to follow, in particular following, a building material drum 3, in particular of a building material transport vehicle 4, and at least one part sensor 5. The building material transport part 2 is designed to transport, or which in particular transports, building material BS which is to be cured at least partially, in particular completely. At least the part sensor 5 is arranged on and/or in the building material transport part 2 and designed to detect, or which in particular detects, at least one intensive variable IG or at least one variable, which corresponds at least to the intensive variable, of the building material BS in the building material transport part 2.

FIG. 1 shows the use of at least the part sensor 5, in particular of the building material apparatus 1, arranged on and/or in the building material transport part 2, in particular of the building material apparatus 1, for detecting, or which in particular detects, at least the intensive variable IG or at least the variable, which corresponds at least to the intensive variable, of the building material BS in the building material transport part 2 following the building material drum 3. The building material transport part 2 is designed to transport, or which in particular transports, the building material BS.

In detail, the building material apparatus 1 is a concrete apparatus 1'.

Additionally or alternatively, the building material transport part 2 is a concrete transport part 2', in particular intended to follow, in particular following, a concrete drum 3', in particular of a concrete transport vehicle 4'.

Further additionally or alternatively, the building material transport part 2 is designed for transporting, or which in particular transports, concrete BT which is to be cured.

Further additionally or alternatively, at least the part sensor 5 is designed to detect, or which in particular detects, the intensive variable IG or the corresponding variable of the concrete BT.

Furthermore, at least the part sensor 5 is designed for detecting, or which in particular detects, a moisture FT and/or a temperature TE of the building material BS.

In addition, at least the part sensor 5 is designed for detecting, or which in particular detects, the intensive variable IG or the corresponding variable by means of microwaves MW.

Furthermore, the building material apparatus 1 has a flat probe 6, in particular a disk probe 6' or a rectangular probe 6". The flat probe 6 has the part sensor 5.

Moreover, the building material transport part 2 has a baffle plate 7. The part sensor 5 is arranged on and/or in the baffle plate 7.

In the exemplary embodiment shown, the flat probe 6 is arranged on and/or in the baffle plate 7.

Furthermore, in the exemplary embodiment shown, the building material transport part 2 is an outlet hopper 8, in particular of the building material transport vehicle 4 and/or intended to follow, in particular following, the building material drum 3, a chute 9, in particular of the building material transport vehicle 4 and/or intended to follow, in particular following, the outlet hopper 8, a building material bucket 10, in particular a crane bucket 10', in particular intended to follow, in particular following, the outlet hopper 8 and/or the chute 9, an inlet hopper 11 of a building material pump 12, in particular intended to follow, in particular following, the outlet hopper 8 and/or the chute 9 and/or an end hose 13 of the building material pump 12 and/or of a building material distribution apparatus 20, in particular a building material distribution boom 20', in particular intended to follow, in particular following, the building material pump 12.

Consequently, in the exemplary embodiment shown, the building material apparatus 1 has five building material transport parts 2. In alternative exemplary embodiments, the building material apparatus can have, in particular either, only one single building material transport part, advantageously the outlet hopper, or two, three, four or at least six building material transport parts.

In addition, in the exemplary embodiment shown, the building material apparatus 1 has five part sensors 5. In other words: a number of the part sensors corresponds to, in particular equals, a number of the building material transport parts. In alternative exemplary embodiments, the building material apparatus can, in particular thus, have, in particular either, only one part sensor or two, three, four or at least six part sensors.

Furthermore, in the exemplary embodiment shown, the building material apparatus 1 has the building material transport vehicle 4, in particular a truck mixer 4", the building material pump 12 and/or the building material distribution apparatus 20, in particular the building material distribution boom 20'. In particular, the building material apparatus 1 is the building material transport vehicle 4, in particular the truck mixer 4", and/or the building material pump 12 and/or the building material distribution apparatus 20, in particular the building material distribution boom 20'.

In alternative exemplary embodiments, the building material apparatus can have, in particular be, in particular either, the building material transport vehicle, the building material pump or the building material distribution apparatus. Advantageously, the building material transport vehicle.

Additionally or alternatively, the building material apparatus 1 has the building material drum 3, in particular a mixing drum 3".

Moreover, the building material apparatus 1, in particular the building material transport vehicle 4, has an ascertaining device 14, in particular a detecting device 14'. The ascertaining device 14 is designed for ascertaining, or which in particular ascertains, in particular the detecting device 14' is designed for detecting, or which in particular detects, a consistency KO and/or a viscosity VI or a variable, which corresponds to the consistency and/or the viscosity, of the building material BS, in particular in the building material drum 3, in particular a drive variable AG of a drive device 15 for rotationally driving the building material drum 3.

In particular, the building material apparatus 1, in particular the building material transport vehicle 4, has the drive device 15.

Furthermore, the building material apparatus 1, in particular the building material transport vehicle 4, has a determining device 16. The determining device 16 is designed for determining, or which in particular determines, a metering variable DG based on at least the detected intensive variable IG or the detected corresponding variable, in particular and the ascertained consistency KO and/or the ascertained viscosity VI or the ascertained corresponding variable, and information Info on an arrangement location AO of the part sensor 5 and/or on the building material transport part 2.

In addition, the building material apparatus 1, in particular the building material transport vehicle 4, has a data transmission device 17. The data transmission device 17 is designed for the, in particular wireless, data transmission, in particular radio data transmission, of, or which in particular transmits, at least the detected intensive variable IG or the detected corresponding variable, in particular and the ascertained consistency KO and/or the ascertained viscosity VI or the ascertained corresponding variable and/or the information Info on the arrangement location AO of the part sensor 5 and/or on the building material transport part 2, or the metering data DG based on the intensive variable IG, in particular and the consistency KO and/or the viscosity VI, or the corresponding variable, in particular and the information Info on the arrangement location AO of the part sensor 5 and/or on the building material transport part 2, in particular to a building material mixing plant 18.

Furthermore, the building material apparatus 1, in particular the building material transport vehicle 4, has an auxiliary consumer 19, in particular a control device 19' for controlling the building material drum 3. For energy and/or data transmission, the auxiliary consumer 19 and the part sensor 5, in particular arranged on and/or in the building material transport part 2 of the building material transport vehicle 4, are contact-connected, in particular cable-connected, in particular by a, in particular the common, energy supply and/or data transmission device 17'.

In particular, the building material apparatus 1, in particular the building material transport vehicle 4, has the energy supply and/or data transmission device 17'.

In summary and/or in other words:

The building material mixing plant 18 meters, mixes and fills or conveys the building material BS into the building material drum 3 of the building material transport vehicle 4, in particular by means of a filling or inlet hopper of the building material transport vehicle 4 and/or through an opening in the building material drum 3.

The building material transport vehicle 4 transports the building material BS in the building material drum 3 from the building material mixing plant 18 to a building site.

In particular on the building site, the building material drum 3 fills or empties the building material BS into the outlet hopper 8. In the process, the intensive variable IG or the corresponding variable is detected.

In particular, spiral blades are arranged on the inner walls of the building material drum 3. In driving mode or during transport, a direction of rotation of the building material drum 3 is such that the building material is conveyed forward and falls over the blades. In particular, premature curing or binding of the building material and separation are thus prevented. On arrival at the building site, the direction of rotation is reversed for emptying such that the building material is conveyed out toward the upper opening according to the principle of the conveying screw.

The outlet hopper 8 transports the building material BS into the chute 9 and/or the building material bucket 10 and/or the inlet hopper 11 of the building material pump 12. In the process, in particular in each case, the intensive variable IG or the corresponding variable is detected.

In particular, the baffle plate 7 guides the building material BS upon leaving the building material drum 3 such that the building material bucket 10 can be optimally filled.

Additionally or alternatively, the chute 9 transports the building material BS into the building material bucket 10 and/or the inlet hopper 11 of the building material pump 12. In the process, in particular in each case, the intensive variable IG or the corresponding variable is detected.

Further additionally or alternatively, the building material bucket 10 transports the building material BS into a formwork, in particular in which the building material BS cures at least partially, in particular completely.

Further additionally or alternatively, the building material pump 12 transports the building material BS into its end hose 13 and/or the building material distribution apparatus 20. In the process, the intensive variable IG or the corresponding variable is detected.

Further additionally or alternatively, the end hose 13 transports the building material BS into a, in particular the, formwork, in particular in which the building material BS cures at least partially, in particular completely.

The detection and/or the data transmission, in particular to the building material mixing plant 18, allow/allows a statement on the building material quality of the transported or discharged building material BS and/or then make/makes it possible for a mixing master and/or a laboratory technician to respond to any changes in the building material BS.

Additionally or alternatively, cleaning of the part sensor 5, in particular of the flat probe 6, can then be carried out or take place after each transport, in particular each emptying.

As the exemplary embodiments shown and explained above make clear, the invention provides an advantageous building material apparatus having at least one part sensor and the advantageous use of at least one such part sensor, in particular of such a building material apparatus, which each have improved properties.

The invention claimed is:

1. A building material apparatus, comprising:
   a building material transport part that follows a building material drum, wherein the building material transport part is designed to transport building material which is to be at least partially cured;
   a part sensor, wherein the part sensor is arranged on and/or in the building material transport part to detect at least one intensive variable, or at least one variable corresponding at least to the intensive variable, of the building material in the building material transport part; and
   a determining device, wherein the determining device is designed to determine a metering variable based on at least the detected intensive variable or the detected corresponding variable and information on an arrangement location of the part sensor and/or on a type of the building material transport part and an arrangement location-specific and/or building material transport part-specific characteristic formula and/or an arrangement location-specific and/or building material transport part-specific characteristic map,
   wherein the building material transport part is one of:
      an outlet hopper of a building material transport vehicle,
      a chute of the building material transport vehicle,
      a crane bucket,
      an inlet hopper of a building material pump, or
      an end hose of the building material pump and/or of a building material distribution boom.

2. The building material apparatus as claimed in claim 1, wherein
   the building material apparatus is a concrete apparatus, and/or
   the building material transport part is a concrete transport part that follows a concrete drum of a concrete transport vehicle, and/or
   the building material transport part is designed to transport concrete to be cured, and/or
   the part sensor is designed to detect the intensive variable, or the variable corresponding at least to the intensive variable, of the concrete.

3. The building material apparatus as claimed in claim 1, wherein
   the part sensor is designed to detect a moisture and/or a temperature of the building material.

4. The building material apparatus as claimed in claim 1, wherein
   the part sensor is designed to detect the intensive variable, or the variable corresponding at least to the intensive variable, via microwaves.

5. The building material apparatus as claimed in claim 1, further comprising:
   a flat probe, wherein the flat probe has the part sensor.

6. The building material apparatus as claimed in claim 5, wherein
   the flat probe is a disk probe or a rectangular probe.

7. The building material apparatus as claimed in claim 1, wherein
   the building material transport part has a baffle plate, and the part sensor is arranged on and/or in the baffle plate.

8. The building material apparatus as claimed in claim 1, wherein the building material apparatus comprises:
   the building material transport vehicle in a form of a truck mixer, the building material pump, the building material distribution boom, or the building material drum in a form of a mixing drum.

9. The building material apparatus as claimed in claim 1, further comprising:
   an ascertaining device, wherein the ascertaining device is designed to ascertain a consistency and/or a viscosity, or a variable corresponding to the consistency and/or the viscosity, of the building material.

10. The building material apparatus as claimed in claim 9, wherein
    the ascertaining device ascertains the consistency and/or the viscosity, or the variable corresponding to the consistency and/or the viscosity, of the building material in the building material drum.

11. The building material apparatus as claimed in claim 10, wherein the ascertaining device ascertains a drive variable of a drive device for rotationally driving the building material drum.

12. The building material apparatus as claimed in claim 10, further comprising:
a data transmission device, wherein the data transmission device is designed for data transmission of at least the detected intensive variable or the detected corresponding variable, and the ascertained consistency and/or the ascertained viscosity or the ascertained corresponding variable, and/or the information on the arrangement location of the part sensor and/or on the building material transport part, or a metering variable based on the intensive variable, and the consistency and/or the viscosity, or the corresponding variable, and the information on the arrangement location of the part sensor and/or on the building material transport part, for a building material mixing plant.

13. The building material apparatus as claimed in claim 1, further comprising:
a control device for controlling the building material drum, and
for energy and/or data transmission, the control device and the part sensor are contact-connected by an energy supply and/or data transmission device.

14. A method for detecting at least one intensive variable, or at least one variable corresponding to the intensive variable, of building material that is to be at least partially cured, which method comprises utilizing the building material apparatus of claim 1.

\* \* \* \* \*